US011856565B2

(12) United States Patent
Cariou et al.

(10) Patent No.: US 11,856,565 B2
(45) Date of Patent: Dec. 26, 2023

(54) COMMUNICATING ELEMENTS BETWEEN MULTI-LINK DEVICES

(71) Applicant: Intel Corporation, Santa Clara, CA (US)

(72) Inventors: Laurent Cariou, Milizac (FR); Daniel F. Bravo, Hillsboro, OR (US); Cheng Chen, Camas, WA (US); Chittabrata Ghosh, Fremont, CA (US); Po-Kai Huang, San Jose, CA (US); Ido Ouzieli, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 17/323,445

(22) Filed: May 18, 2021

(65) Prior Publication Data

US 2021/0274500 A1    Sep. 2, 2021

Related U.S. Application Data

(60) Provisional application No. 63/026,289, filed on May 18, 2020.

(51) Int. Cl.
*H04L 12/28*       (2006.01)
*H04W 72/0453*  (2023.01)
*H04W 48/08*     (2009.01)
*H04J 1/16*        (2006.01)

(52) U.S. Cl.
CPC ....... *H04W 72/0453* (2013.01); *H04W 48/08* (2013.01)

(58) Field of Classification Search
CPC .. H04L 69/14; H04W 72/0453; H04W 76/15; H04W 84/12
USPC .......................................... 370/252, 329, 430
See application file for complete search history.

(56) References Cited

U.S. PATENT DOCUMENTS

2021/0321243 A1*  10/2021  Patil ...................... H04W 76/15
2021/0321410 A1*  10/2021  Patil .................... H04W 74/006

* cited by examiner

*Primary Examiner* — John Pezzlo
(74) *Attorney, Agent, or Firm* — Schwegman Lundberg & Woessner, P.A.

(57) ABSTRACT

Methods, apparatuses, and computer readable media for communicating elements between multi-link devices are disclosed. Apparatuses of a first access points (AP) of an AP multi-link device (MLD) are disclosed, where the apparatuses comprise processing circuitry configured to encode a first portion of a first beacon frame or first response frame, and in response to a second AP of the AP MLD transmitting, on a second frequency band, a second beacon frame or a second probe response frame comprising a channel switch announcement element or an enhanced channel switch announcement frame, encoding a second portion of the first beacon frame or the first probe response frame, the second portion comprising the channel switch announcement element or the enhanced channel switch announcement frame. The processing circuitry is further configured to configure the first AP of the AP MLD to transmit, on a first frequency band, the first beacon frame.

20 Claims, 18 Drawing Sheets

| ELEMENT ID 902 | LENGTH 904 | CHANNEL SWITCH MODE 906 | NEW OPERATING CLASS 908 | NEW CHANNEL NUMBER 910 | CHANNEL SWITCH COUNT 912 |
|---|---|---|---|---|---|
| 1 | 1 | 1 | 1 | 1 | 1 |

EXTENDED CHANNEL SWITCH ANNOUNCEMENT ELEMENT 900

OCTETS 914

FIG. 9

COMMUNICATING ELEMENTS BETWEEN MULTI-LINK DEVICES

PRIORITY CLAIM

This application claims the benefit of priority under 35 USC 119(e) to U.S. Provisional Patent Application Ser. No. 63/026,289 filed May 18, 2020, which is incorporated herein by reference in their entirety.

TECHNICAL FIELD

Embodiments relate to multi-link devices (MLDs) operating in accordance with wireless local area networks (WLANs) and Wi-Fi networks including networks operating in accordance with different versions or generations of the IEEE 802.11 family of standards. Some embodiments relate to communicating elements or fields transmitted by an access point (AP) of the MLD operating on a first frequency band with APs of the MLD operating on other frequency bands.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 9 illustrates an extended channel switch announcement element, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
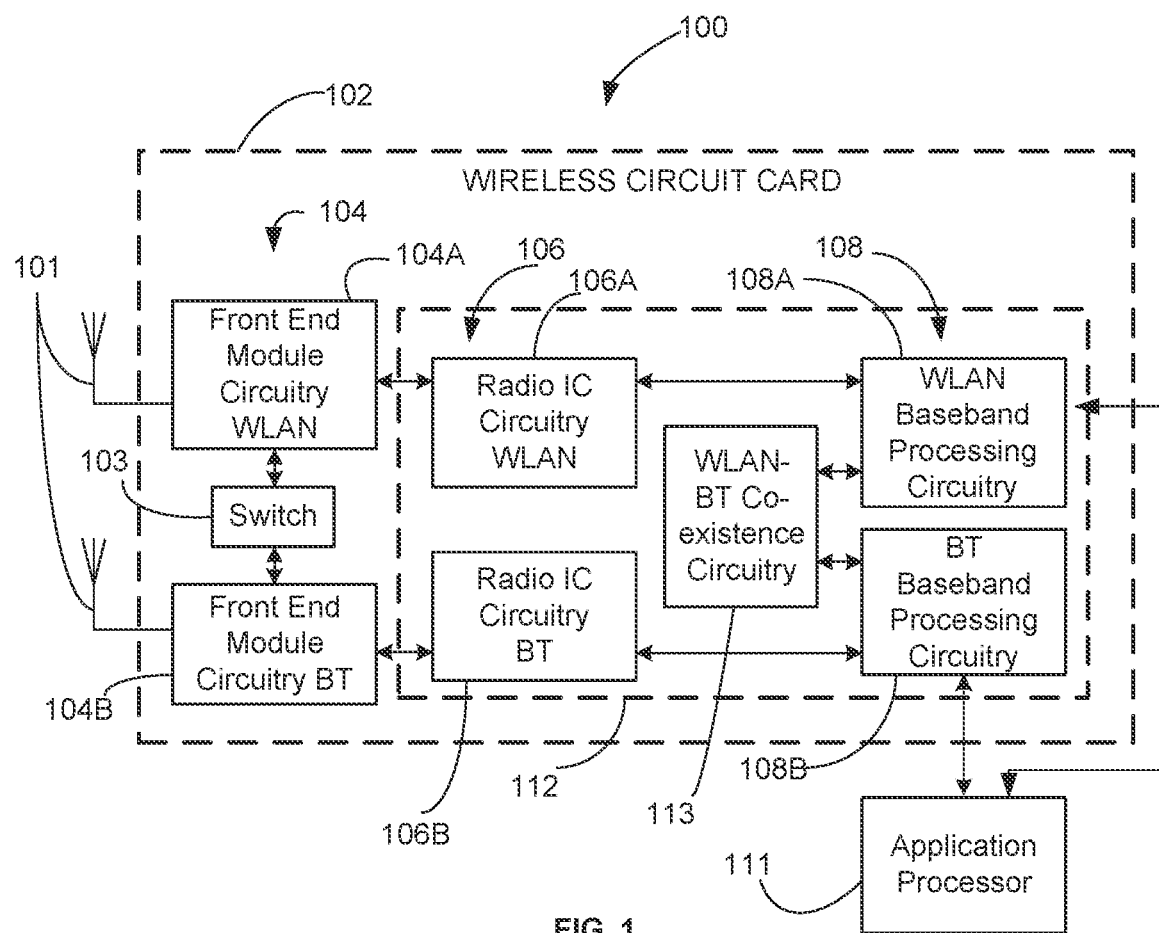
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
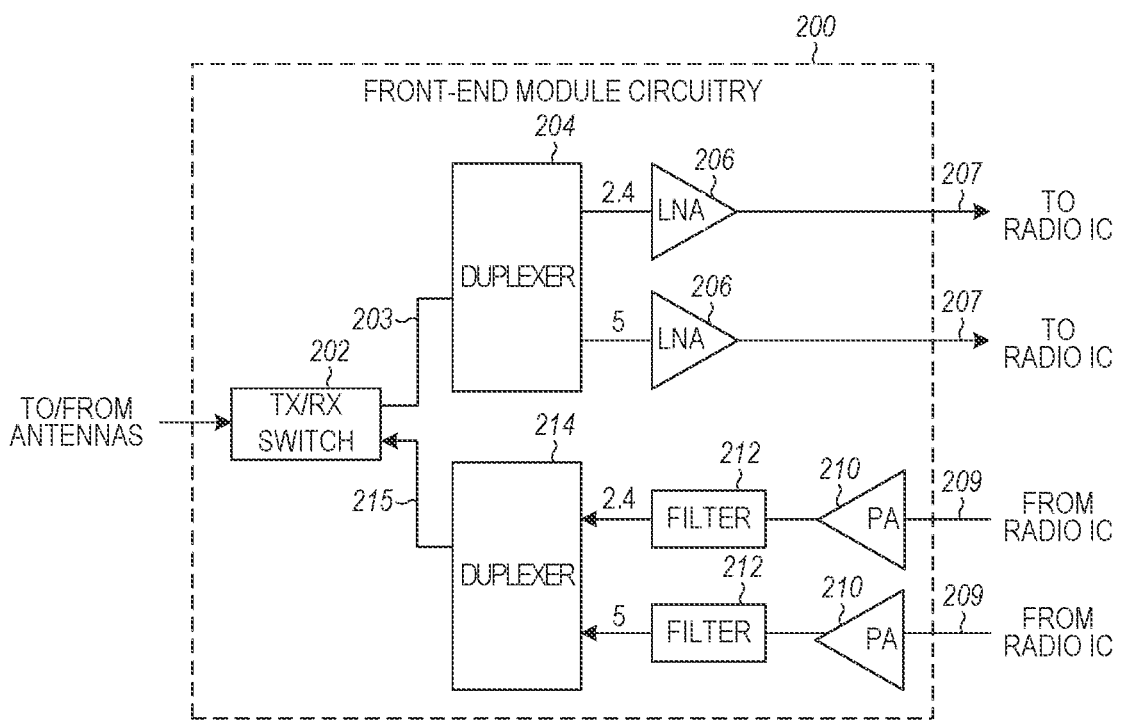
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
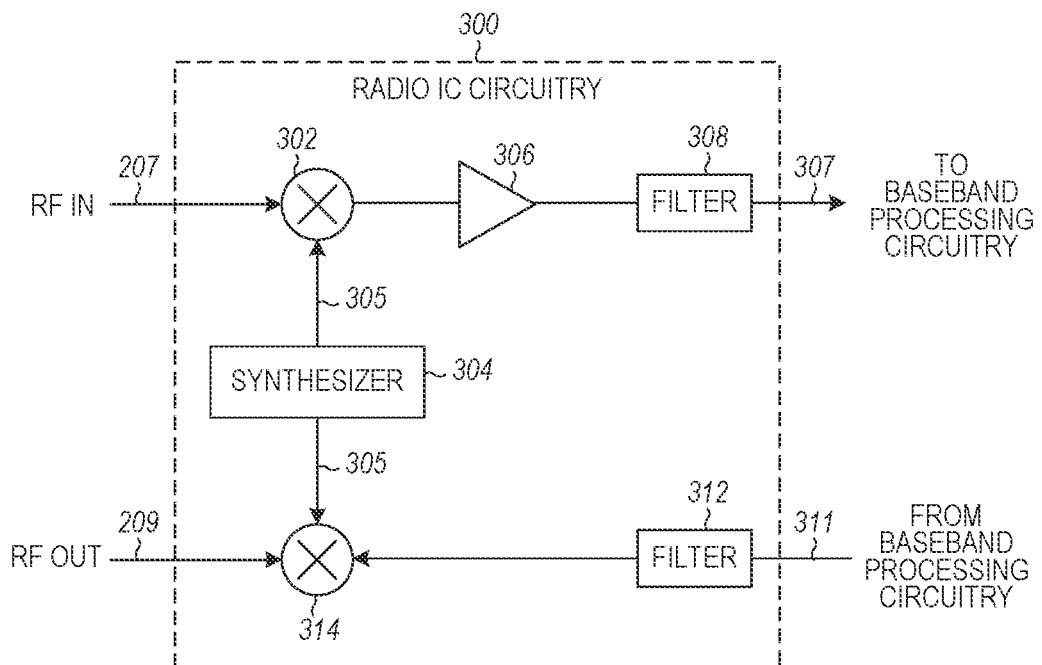
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
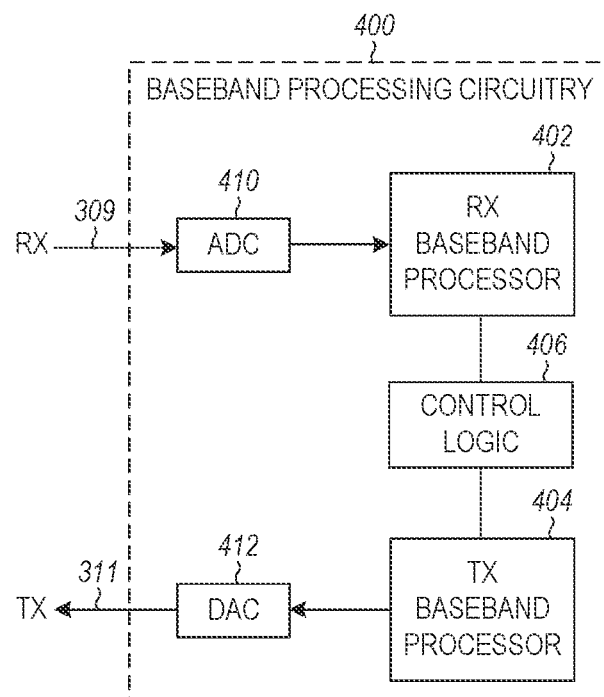
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
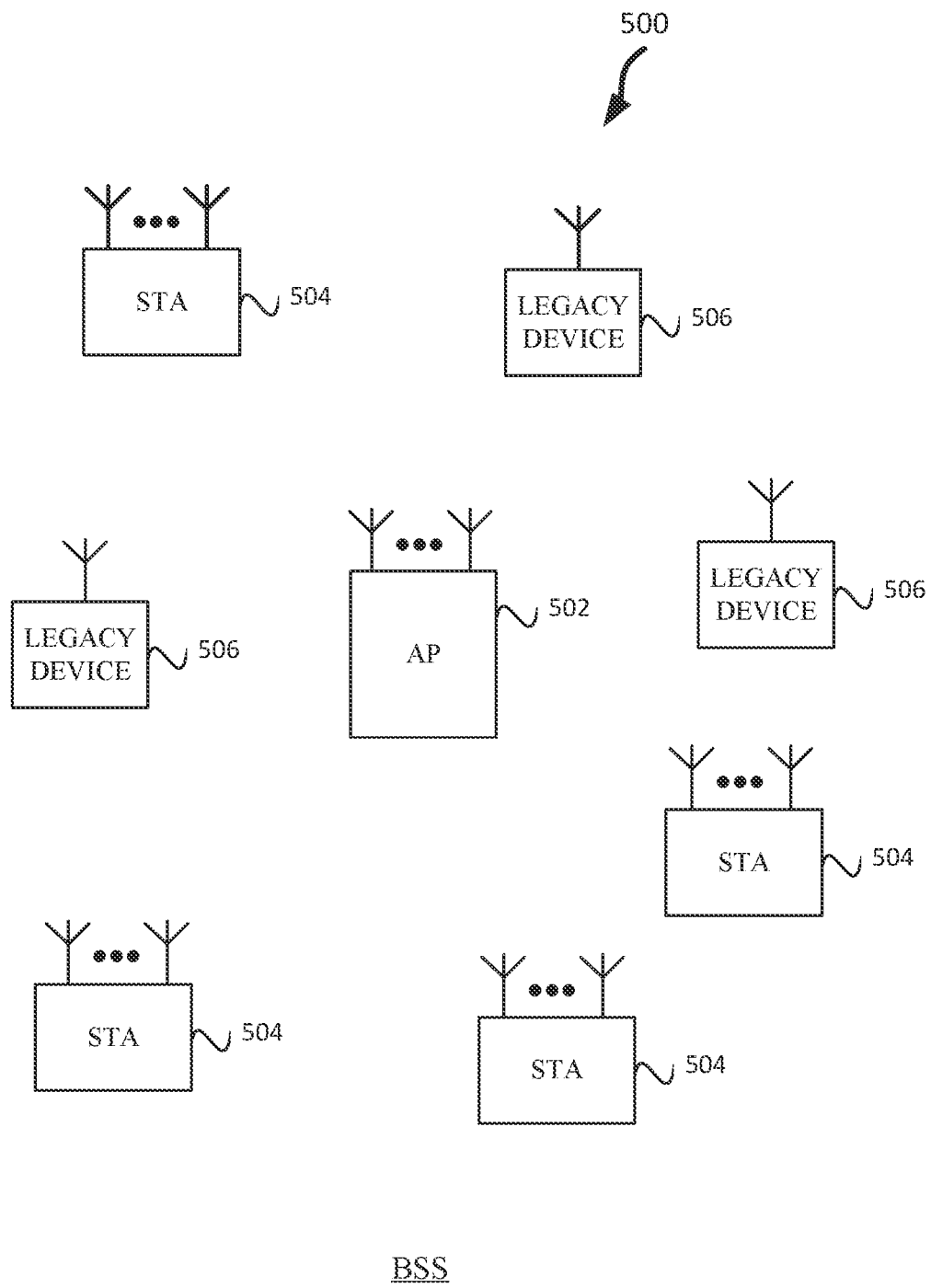
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11 be extremely high throughput (EHT) and/or high efficiency (HE) IEEE 802.11ax. In some embodiments, the STAs 504 and/or AP 520 are configured to operate in accordance with IEEE 802.11az. In some embodiments, IEEE 802.11EHT may be termed Next Generation 802.11.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11be or another wireless protocol.

The AP 502 may communicate with legacy devices 506 in accordance with legacy IEEE 802.11 communication techniques. In example embodiments, the H AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDM A and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 502 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the HE station 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-18.

In example embodiments, the STAs 504 and/or the HE AP 502 are configured to perform the methods and operations/functions described herein in conjunction with FIGS. 1-18. In example embodiments, an apparatus of the STA 504 and/or an apparatus of the AP 502 are configured to perform the methods and functions described herein in conjunction with FIGS. 1-18. The term Wi-Fi may refer to one or more of the IEEE 802.11 communication standards. AP and STA may refer to EHT/HE access point and/or EHT/HE station as well as legacy devices 506.

In some embodiments, a HE AP STA may refer to a AP 502 and/or STAs 504 that are operating as EHT APs 502. In some embodiments, when a STA 504 is not operating as an AP, it may be referred to as a non-AP STA or non-AP. In some embodiments, STA 504 may be referred to as either an AP STA or a non-AP.

Figure 6:
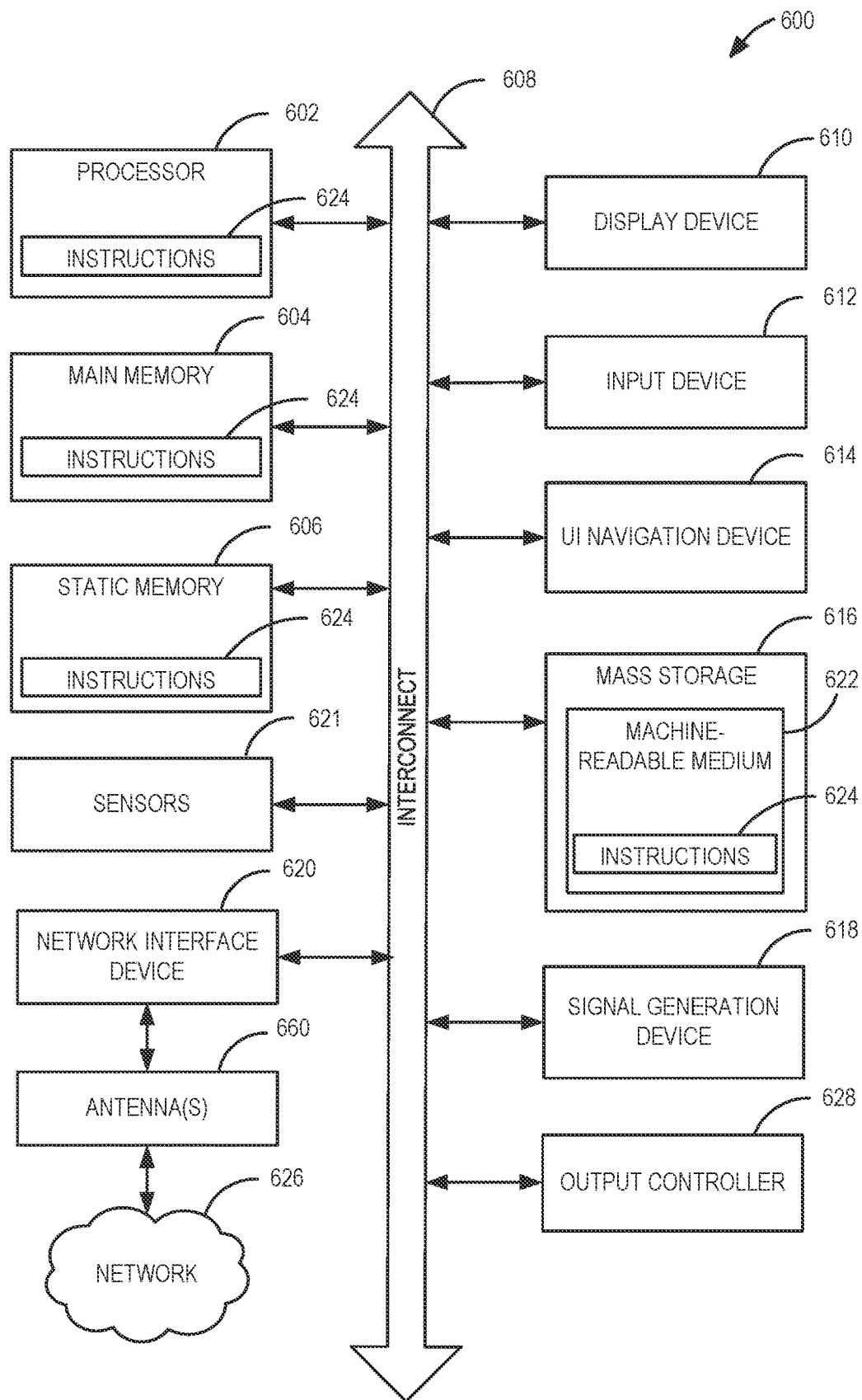
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
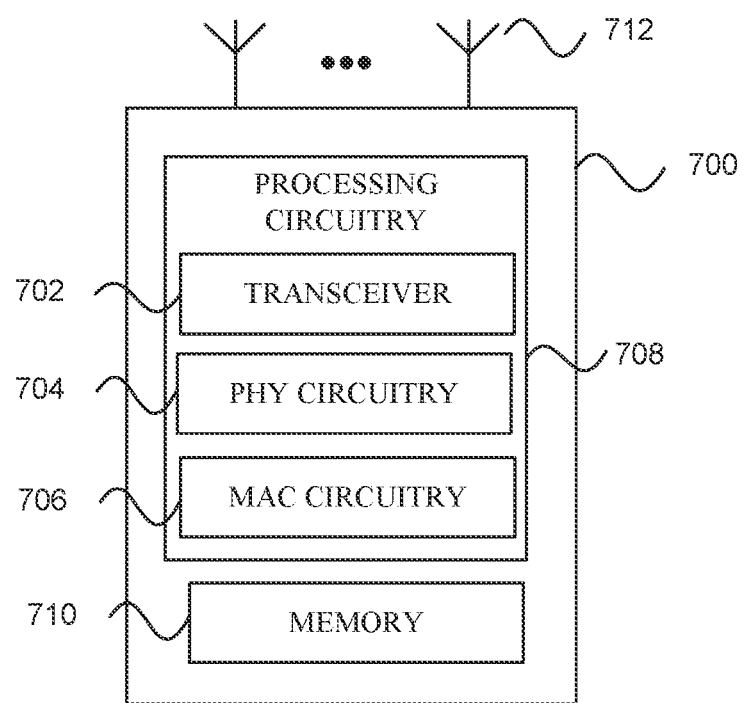
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

A technical problem is how to communicate with STAs and other devices that may only listen to one frequency band at a time but are associated with more than one frequency band. Some embodiments enable MLDs to ensure that STAs and other wireless devices communicating with the MLD do not miss important fields or elements. Some STAs or other wireless devices communicating with the MLD may be associated with the MLD on several different frequency bands, but only receiving or listening to one frequency band. The MLD and the STA or other wireless device, however, may need to follow procedures communicated on other frequency bands of the MLD. Embodiments include fields or elements transmitted by a first AP of the MLD operating on first frequency band being transmitted by other APs operating on different frequency bands. In this STAs and other wireless devices can follow the procedures, if any, as if the STA or other wireless device received the field or element from the first AP.

Figure 8:
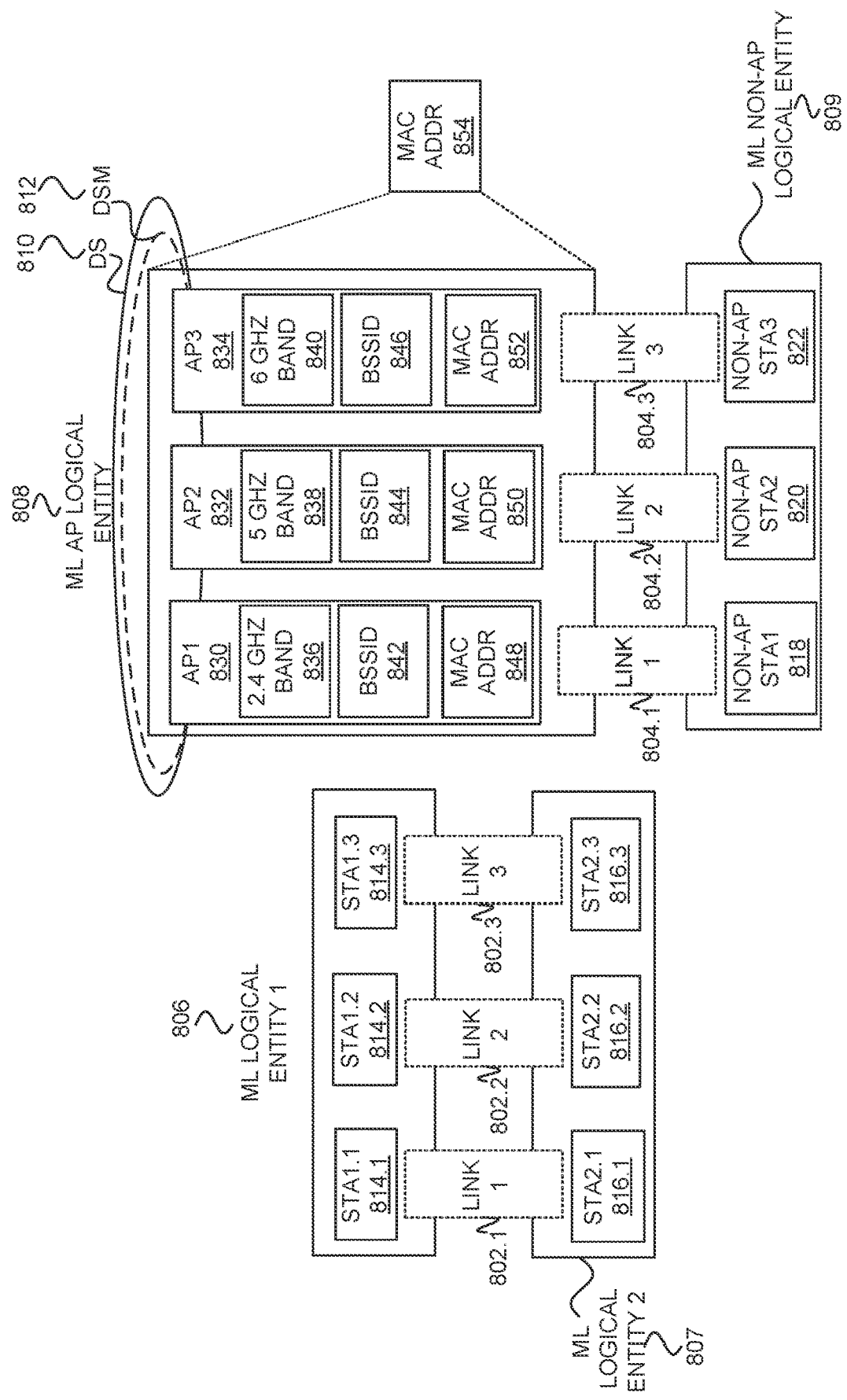
FIG. 8 illustrates a MLDs, in accordance with some embodiments.

FIG. 8 illustrates a MLDs 800, in accordance with some embodiments. Illustrates in FIG. 8 is ML logical entity 1 806, ML logical entity 2 807, ML AP logical entity 808, and ML non-AP logical entity 809.

The ML logical entity 1 806 includes three STAs, STA1.1 814.1, STA 1.2 814.2, and STA 1.3 814.3 that operate in accordance with link 1 802.1, link 2 802.2, and link 3 802.3, respectively. The Links are different frequency bands such as 2.4 GHz band, 5 GHz band, 6 GHz band, and so forth. ML logical entity 2 807 includes STA2.1 816.1, STA2.2 816.2, and STA2.3 816.3 that operate in accordance with link 1 802.1, link 2 802.2, and link 3 802.3, respectively. In some embodiments ML logical entity 1 806 and ML logical entity 2 807 operate in accordance with a mesh network. Using three links enables the ML logical entity 1 806 and ML logical entity 2 807 to operate using a greater bandwidth and more reliably as they can switch to using a different link if there is interference or if one link is superior due to operating conditions.

The distribution system (DS) 810 indicates how communications are distributed and the DS medium (DSM) 812 indicates the medium that is used for the DS 810, which in this case is the wireless spectrum.

ML AP logical entity 808 includes AP1 830, AP2 832, and AP3 834 operating on link 1 804.1, link 2 804.2, and link 3 804.3, respectively. ML AP logical entity 808 includes a MAC address 854 that may be used by applications to transmit and receive data across one or more of AP1 830, AP2 832, and AP3 834. AP1 830, AP2 832, and AP3 834 includes a frequency band, which are 2.4 GHz band 836, 5 GHz band 838, and 6 GHz band 840, respectively. AP1 830, AP2 832, and AP3 834 includes different BSSIDs, which are BSSID 842, BSSID 844, and BSSID 846, respectively. AP1 830, AP2 832, and AP3 834 includes different media access control (MAC) address (addr), which are MAC adder 848, MAC addr 850, and MAC addr 852, respectively. The AP 502 is a ML AP logical entity 808, in accordance with some embodiments. The STA 504 is a ML non-AP logical entity 809, in accordance with some embodiments.

The ML non-AP logical entity 809 includes non-AP STA1 818, non-AP STA2 820, and non-AP STA3 822. Each of the non-AP STAs may be have MAC addresses and the ML non-AP logical entity 809 may have a MAC address that is different and used by application programs where the data traffic is split up among non-AP STA1 818, non-AP STA2 820, and non-AP STA3 822.

The STA 504 is a non-AP STA1 818, non-AP STA2 820, or non-AP STA3 822, in accordance with some embodiments. The non-AP STA1 818, non-AP STA2 820, and non-AP STA3 822 may operate as if they are associated with a BSS of AP1 830, AP2 832, or AP3 834, respectively, over link 1 804.1, link 2 804.2, and link 3 804.3, respectively.

A Multi-link device such as ML logical entity 1 806 or ML logical entity 2 807, is a logical entity that contains one or more STAs 814, 816. The ML logical entity 1 806 and ML logical entity 2 807 each has one MAC data service interface and primitives to the logical link control (LLC) and a single address associated with the interface, which can be used to communicate on the DSM 812. Multi-link logical entity allows STAs 814, 816 within the multi-link logical entity to have the same MAC address. In some embodiments a same MAC address is used for application layers and a different MAC address is used per link.

In infrastructure framework, ML AP logical entity 808, includes APs 830, 838, 840, on one side, and ML non-AP logical entity 809, which includes non-APs STAs 818, 820, 822 on the other side.

ML AP device (AP MLD): is a ML logical entity, where each STA within the multi-link logical entity is an EHT AP 502, in accordance with some embodiments. ML non-AP device (non-AP MLD) A multi-link logical entity, where each STA within the multi-link logical entity is a non-AP EHT STA 504. AP1 830, AP2 832, and AP3 834 may be operating on different bands and there may be fewer or more APs. There may be fewer or more STAs as part of the ML non-AP logical entity 809.

In some embodiments the ML AP logical entity 808 is termed an AP MLD or MLD. In some embodiments ML non-AP logical entity 809 is termed a MLD or a non-AP MLD. Each AP (e.g., AP1 830, AP2 832, and AP3 834) of the MLD sends a beacon frame that includes: a description of its capabilities, operation elements, a basic description of the other AP of the same MLD that are collocated, which may be a report in a Reduced Neighbor Report element or another element such as a basic multi-link element 1600. AP1 830, AP2 832, and AP3 834 transmitting information about the other APs in beacons and probe response frames enables STAs of non-AP MLDs to discover the APs of the AP MLD.

A technical problem is described as follows. If AP2 832 operating on 5 GHz band 838 is operating on a Dynamic Frequency Selection (DFS) channel, it is possible that AP2 832 detects a radar and has to stop operating on its channel and has to change its operating channel. Similarly, this can happen to AP3 834 operating on 6 GHz band 840, especially with standard power APs. The protocol currently used in such situation is the Extended Channel Switch Announcement 900 (or channel switch announcement 1000) is transmitted as part of the beacon and probe response or another frame. Similarly, it is possible for an AP to include in its beacons and probe responses a Quiet element 1200 or Quiet Channel Element 1300 so that STAs are forbidden to transmit on the operating channel during a specific period (to perform measurements on DFS channels or other channels.)

If an first AP of an AP MLD 808 transmit an element involved in changes to the operation of the first AP (e.g., performing an Extended Channel Switch announcement procedure), then the other APs of the AP MLD 808 transmit in their beacon and probe response frames (and optionally in public action frames) the information in the element from the first AP (e.g., the other APs transmit an Extended Channel Switch Announcement element for the first AP1 until the intended channel switch time.)

The Extended Channel Switch Announcement element 900 is included in a per-STA profile 1504 corresponding to the first AP1 in the multi-link element or basic multi-link element 1600 describing the first AP MLD.

All the functionalities (e.g., Max Channel switch time, Extended channel switch modes, and so forth) existing in Extended Channel Switch Announcement protocol are possible for the APs since the STA will receive the information or the Extended Channel Switch Announcement element 900 from the first AP. Additionally, the first AP includes the Extended Channel Switch Announcement element 900 in beacons/probe response frames it sends.

A STA (e.g., non-AP STA1 830) that is part of an non-AP MLD 809 that receives an extended channel switch announcement element 900 for the first AP (such as AP2 832) from another AP (such as AP1 830) from the same AP MLD 808 as the first AP (AP2 832) with which it has perform multi-link setup will have the STA 1 (non-AP STA2 820) of the same non-AP MLD 809 operating on the same channel as AP1 (AP2 832) follow the Extended Channel Switch Announcement (ECSA) procedure, as if that STA1 (non-AP STA2 820) had received the Extended channel switch announcement frame 900.

This case can happen if the non-AP MLD 809 is a single radio STA and is currently operating on one link at 2.4 GHz band 836, but has setup ML operating with AP2 832 on the 5 GHz band 838 and/or AP3 834 on the 6 GHz band 840, and decides to switch to the 5 GHz band 838 at the same time as the AP2 832 operating on the 5 GHz band 838 is performing a ECSA procedure. In this case, the ECSA is received from AP1 830 operating at 2.4 GHz band 836 and not from the AP2 832 operating at 5 GHz band 838. The ECSA frame 900 indicates that if the channel switch mode 906 field is set to 1 in the extended channel switch announcement element 900, the non-AP STA2 820 operating on the channel of the AP2 832 performing the ECSA shall not transmit on that channel any more.

Non-AP STA2 820 is required to switch to AP2 832 the new channel number indicated in the New Channel Number 910 field and New Operating Class 908 field. Non-AP STA2 820 is not required to disassociate from AP2 832 and re-associate with AP2 832 on the new channel because the channel switching takes places within the same association context, in accordance with some embodiments.

In case, STA 1 is unable to operate in the new channel indicated in the New Channel Number 910 field of the Extended Channel Switch Announcement element 900, then it may switch to a different affiliated AP (e.g., AP3 834) within the same AP MLD 808.

In some embodiments, beacon frames and probe response frames sent by an AP (AP1 830, AP2 832, or AP 834) of an AP MLD 808 include a field called Change Sequence (e.g., BSS parameters change count 1408 or a field within per-STA profile 1504) that indicates a change of system information of another AP within the same AP MLD 808 when a critical update to the Beacon frame in another AP has occurred, where the change sequence is initialized to 0, that increments as the critical update is occurred. Performing an extended Channel Switch Announcement is considered a critical event and therefore the change sequence field for the AP performing the ECSA shall be incremented in the beacon and probe response frames of all APs of the AP MLD 808.

In some embodiments, the AP of the AP MLD 808 that is sending an element of another AP of the same AP MLD 808 such as a Public Action frame for an Extended Channel Switch Announcement frame, indicates the frame or element is for the other AP by including an ID field of the other AP. In some embodiments, an additional ID field in the frame is used to indicate which AP the frame or element is for. The ID field may be a MAC address of the AP or a link ID field. In some embodiments, the other AP is identified with a MAC address 1506 in the per-STA profile 1504 of the multi-link element 1502 where the per-STA profile 1504 includes the MAC address 1506 of the other AP and then elements for the other AP (e.g., element 1 1508 through element N 1510.)

After the channel switch, which is determined on a value in Channel Switch Count 912 field, the first AP (e.g., AP2 832) may send any update to its parameters, and can renegotiate some parameters with an associated STA (e.g. non-AP STA2 820), such as a traffic identification (TID)-to-link mapping.

In case of presence of the ECSA element in a management frame before the switch, the AP sending the management frame may include the ML element in the frame to indicate various multi-link metrics pertaining to the new link it switches to. In case the AP does not include the ML element in the management frame carrying the ECSA element, then it shall include after the switch takes place at least a different Change Sequence value, so that the STA can figure out that new parameters for that AP are now in use such as different channel number, bandwidth (BW), capabilities, and so forth. In some embodiments, the AP2 832 and non-AP STA2 820 renegotiate capabilities without performing an entire new association/ML setup, by having a specific association request and response frame, that are identified as being just for parameter updates, and that include the new parameters for the STA (e.g., non-AP STA2 820) or for the AP (AP2 832). The association status is kept, only the parameters are updated, in accordance with some embodiments.

There may be many ML non-AP logical entities 809 associated with ML AP logical entity 808. In some embodiments, if an AP (AP1 830, AP2 832, or AP3 834) of an AP MLD 808 uses the quiet element 1200 to force the STAs (non-AP STA1 818, non-AP STA2 820, and non-AP STA3 822, respectively) operating on their channel to stop transmitting during a period of time. All the other APs of the AP MLD 808 shall include in the beacon and probe response frames they transmit the quiet element. The quiet offset 1212 field in the quiet element, when transmitted by another AP (e.g., AP1 830 or AP3 834) than the first AP (AP2 832) has the same value as if it was transmitted by the first AP (AP2 832), meaning that the offset is expressed with regards to the TBTT of the first AP (e.g., AP2 832). The TBTT of the first AP (e.g., AP2 832) is also included in the beacon and probe response in the reduced neighbor report element for the first AP (e.g., AP2 832) that is reported. In some embodiments the reduced neighbor report element includes a TBTT information length subfield that indicates the length of each TBTT information field included in the TBTT information set field of the neighbor AP information field.

A STA (e.g., non-AP STA1 818, non-AP STA2 820, or non-AP STA3 822) that is part of an non-AP MLD 809 that receives a quiet element 1200, quiet channel element 1300, or a Maximum (Max) Channel Switch Time element 1100, for the first AP (e.g., AP2 832) from another AP (e.g., AP1 830 or AP3 834) from the same AP MLD 808 as the first AP with which it has performed a multi-link setup will have the STA (non-AP STA2 820) of the same non-AP MLD 809 operating on the same channel as the first AP (e.g., AP2 832)

(or the STA is configured to) follow the procedure relative to a quiet element 1200, quiet channel element 1300, or a Maximum (Max) Channel Switch Time element 1100, as if that STA (non-AP STA2 820) had received the quiet element from the first AP (e.g., AP2 832). Therefore the STA (non-AP STA2 820) would not transmit during the period defined in the Quiet element 1200 or quiet channel element 1300.

In some embodiments, an AP of the ML AP logical entity 808 increases the value (modulo 256) of a Check Beacon field in a next transmitted TIM frame when a critical update occurs to any of the elements inside the Beacon frame. In some embodiments, the Capability Information field includes a critical update flag indicating if a critical update has occurred.

FIG. 9 illustrates an extended channel switch announcement element 900, in accordance with some embodiments. The element identification (ID) 1002 field is an ID of the extended channel switch announcement element 1000. The length 1004 field indicates a length of the extended channel switch announcement element 1000. The channel switch mode 906 field indicates any restrictions on transmission until a channel switch. The new operating class 908 is set to the number of the operating class after the channel switch. The new channel number 910 field is set to the number of the channel to which the AP or STA is moving. For nonmesh STAs, the channel switch count 912 field indicates the number of TBTTs until the STA sending the extended channel switch announcement element 900 switches to the new channel or it is set to 0. A value of 1 indicates the switch occurs immediately before the next TBTT and a value of 0 indicates that the switch occurs at any time after the frame containing the channel switch announcement element 900 is transmitted. Octets 914 indicates a number of octets of the fields.

Figure 10:
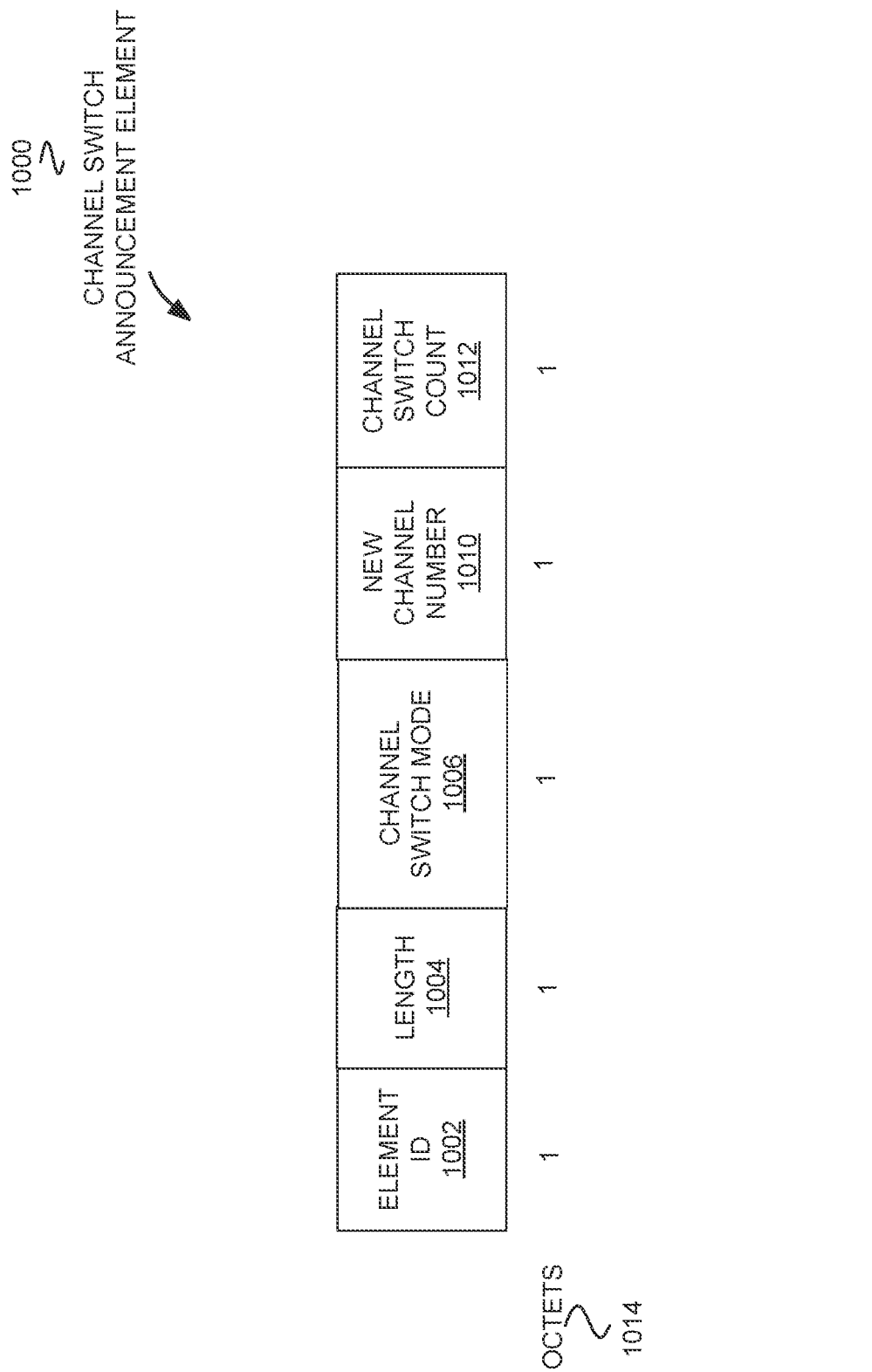
FIG. 10 illustrates a channel switch announcement element, in accordance with some embodiments.

FIG. 10 illustrates a channel switch announcement element 1000, in accordance with some embodiments. The element ID 1002 field is an ID of the channel switch announcement element 1000. The length 1004 field indicates a length of the channel switch announcement element 1000. The new channel number 1010 field is set to the number of the channel to which the AP or STA is moving. For nonmesh STAs, the channel switch count 1012 field indicates the number of TBTTs until the STA sending the channel switch announcement element 1000 switches to the new channel or it is set to 0. A value of 1 indicates the switch occurs immediately before the next TBTT and a value of 0 indicates that the switch occurs at any time after the frame containing the channel switch announcement element 1000 is transmitted. Octets 1014 indicates a number of octets of the fields.

Figure 11:
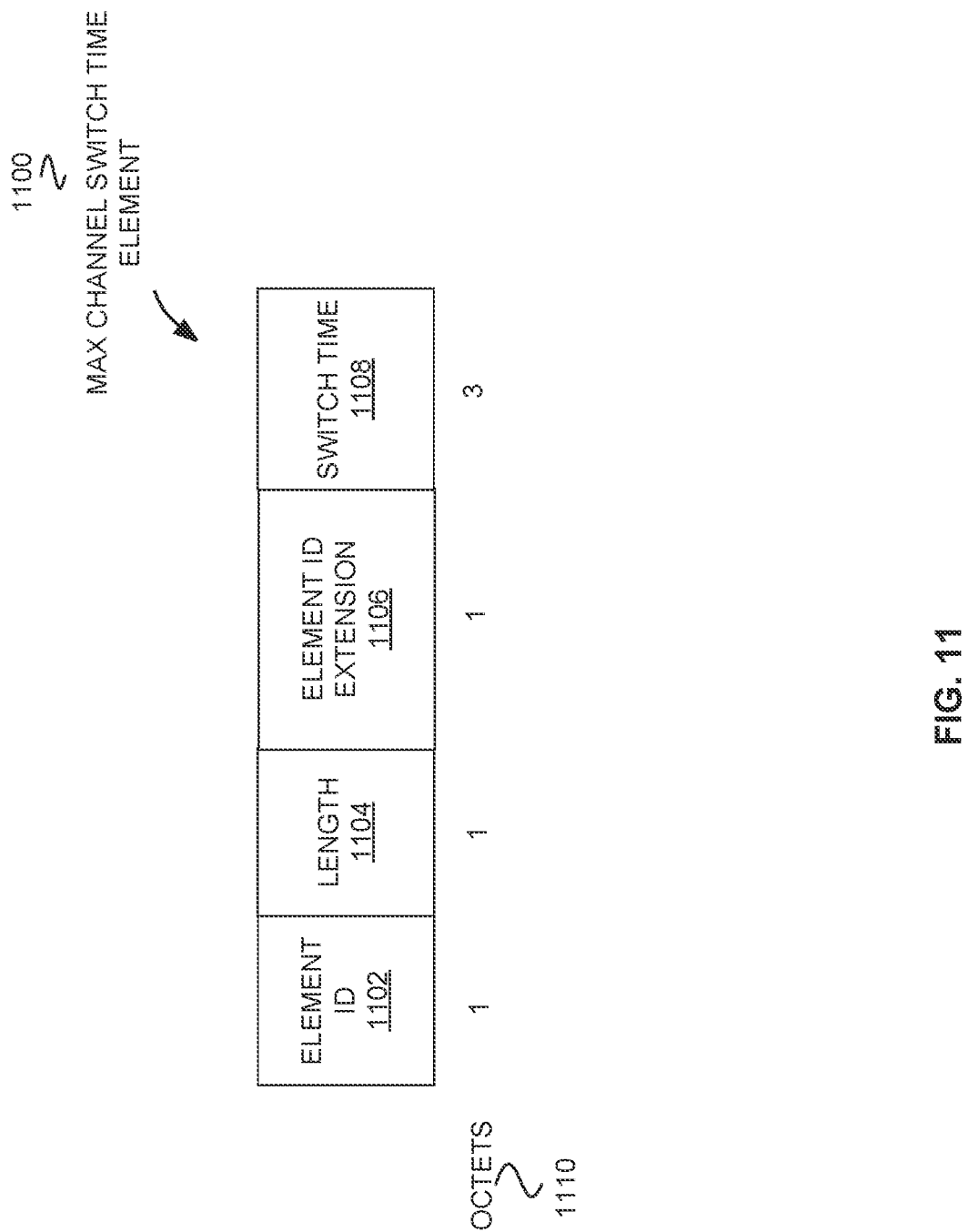
FIG. 11 illustrates a maximum (max) channel switch element, in accordance with some embodiments.

FIG. 11 illustrates a maximum (max) channel switch element 1100, in accordance with some embodiments. The element ID 1102 field in combination with the element ID extension 1106 field is an indication of an ID of the max channel switch element 1100 in combination with the element ID extension 1106 field. The length 1104 field indicates a length of the max channel element 1100 and is set to 4, in accordance with some embodiments. The switch time 1108 field is a 3-octet 1110 field indicating the maximum time delta between the time the last beacon frame is transmitted by the AP in the current channel and the expected time of the first beacon frame in the new channel, expressed in TUs. Octets 1110 indicates a number of octets of the fields.

Figure 12:
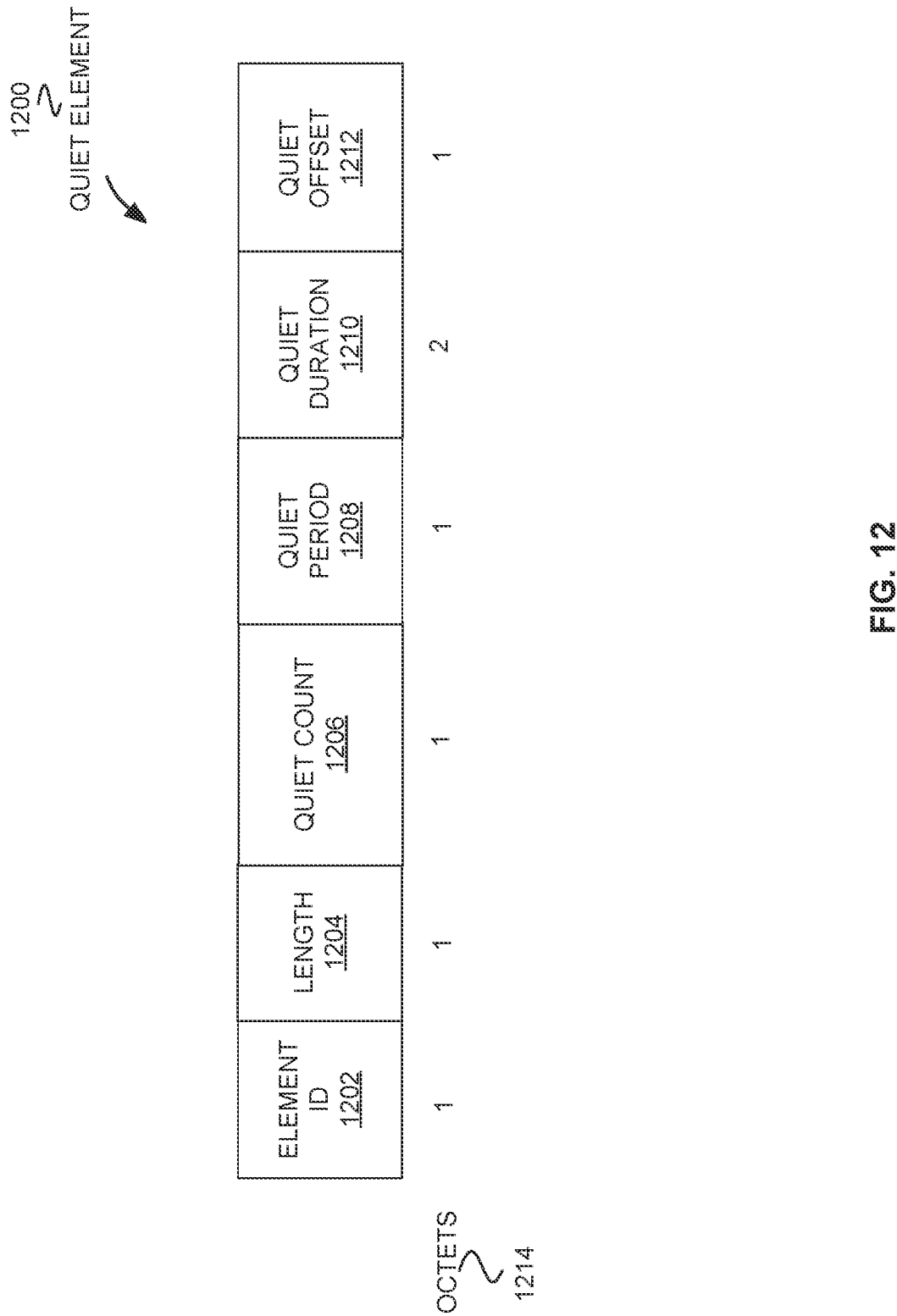
FIG. 12 illustrates a quiet element, in accordance with some embodiments.

FIG. 12 illustrates a quiet element 1200, in accordance with some embodiments. The element ID 1202 field is an ID of the quiet element 1200. The length 1204 field indicates a length of the quiet element 1200. The quiet count 1206 field is set to the number of TBTTs until the beacon interval during which the next quiet interval starts. The quiet period 1208 field is set to the number of beacon intervals between the start of regularly scheduled quiet intervals defined by the quiet element 1200. A Quiet Period 1208 field set to 0 indicates that no periodic quiet interval is defined. The quiet duration 1210 field is set to the duration of the quiet interval in TUs. The quiet offset 1212 field is set to the offset of the start of the quiet interval from the TBTT specified by the Quiet Count field, expressed in TUs. Octets 1214 indicates a number of octets of the fields.

Figure 13:
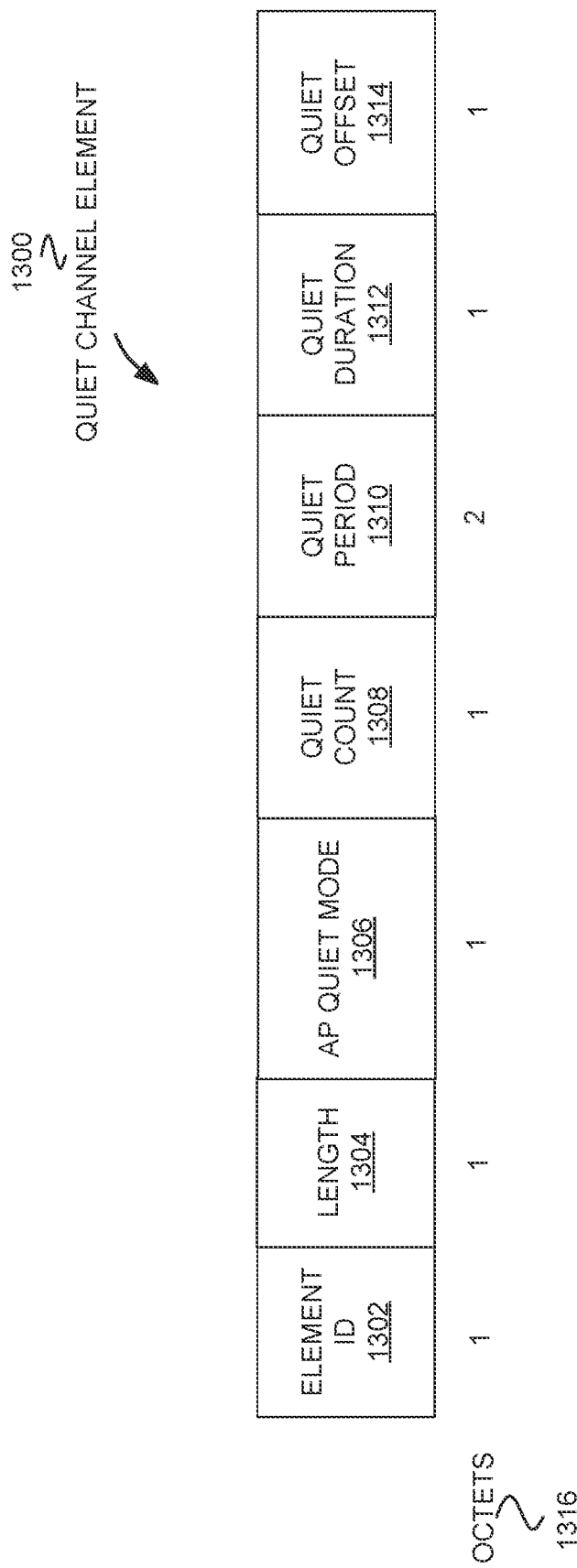
FIG. 13 illustrates a quiet channel element, in accordance with some embodiments.

FIG. 13 illustrates a quiet channel element 1300, in accordance with some embodiments. The element ID 1302 field is an ID of the quiet channel element 1300. The length 1304 field indicates a length of the quiet channel element 1300. The AP quiet mode 1306 field AP Quiet Mode field specifies STA behavior in an infrastructure BSS during the quiet intervals. When communications to the AP are allowed within the primary 80 MHz channel, then the AP Quiet Mode field is set to 1. Otherwise, the AP Quiet Mode field is set to 0. If the AP Quiet Mode 1306 field is 1, then the Quiet Count 1308 field, Quiet Period 1310 field, Quiet Duration 1312 field, and Quiet Offset 1314 field are present in the Quiet Channel element 1300; otherwise, these fields are not present in the Quiet Channel element 1300. The quiet count 1308 field, the quiet period 1310 field, the quiet duration 1312 field, and the quiet offset 1314 field are optional. Octets 1316 indicates a number of octets of the fields.

Figure 14:
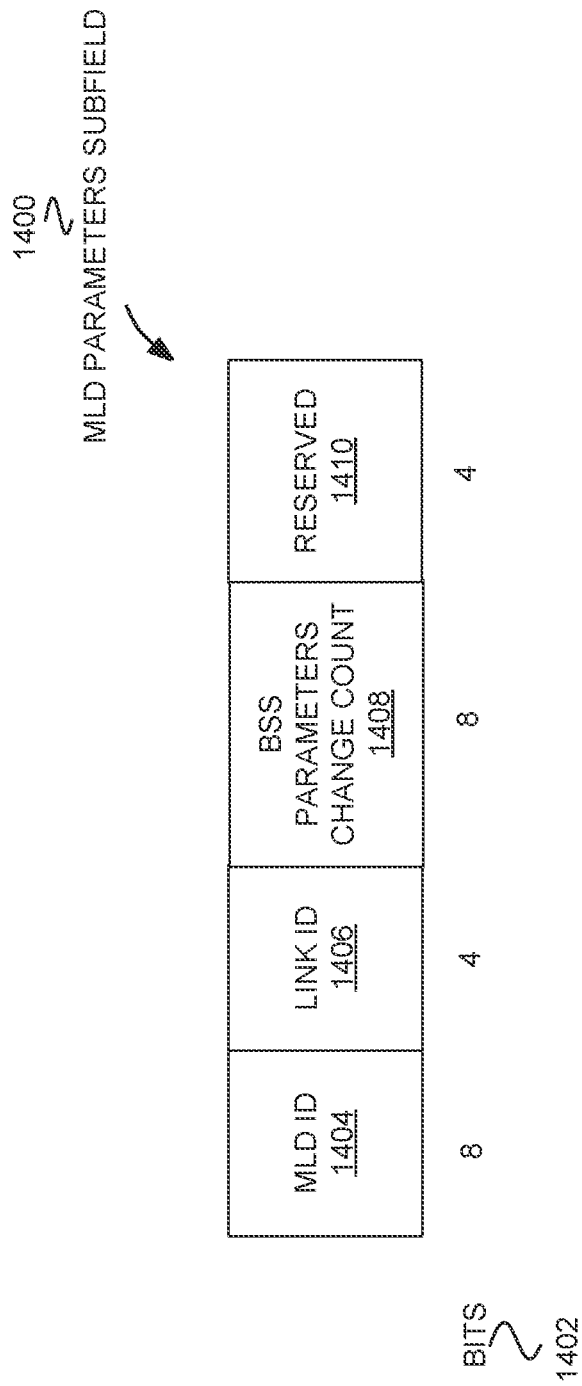
FIG. 14 illustrates a MLD parameters subfield, in accordance with some embodiments.

FIG. 14 illustrates a MLD parameters subfield 1400, in accordance with some embodiments. MLD ID 1404 indicates the ID of the AP MLD to which the reported AP is affiliated. Link ID 1406 subfield indicates the link identifier of the reported AP within the AP MLD to which the reported AP is affiliated. The Link ID 1406 subfield is set to 15 if the reported AP is not part of an AP MLD, or if the reporting AP does not have that information. BSS parameters change count 1408 subfield is an unsigned integer, initialized to 0, that increments when a critical update to the Beacon frame of the reported AP occurs. The critical updates are defined as a list of when parameters of the AP are changed or the inclusion of certain elements. If any of the following are includes by the AP, then it is considered a critical update: extended channel switch announcement element 900, channel switch announcement element 1000, a quiet element 1200, quiet channel element 1300, and so forth. The BSS Parameters Change Count 1408 subfield is set to 255 if the reported AP is not part of an AP MLD, or if the reporting AP does not have that information. Reserved 1410 is a reserved subfield. The MLD parameters subfield 1400 is a subfield of a TBTT information 1500 field.

Figure 15:
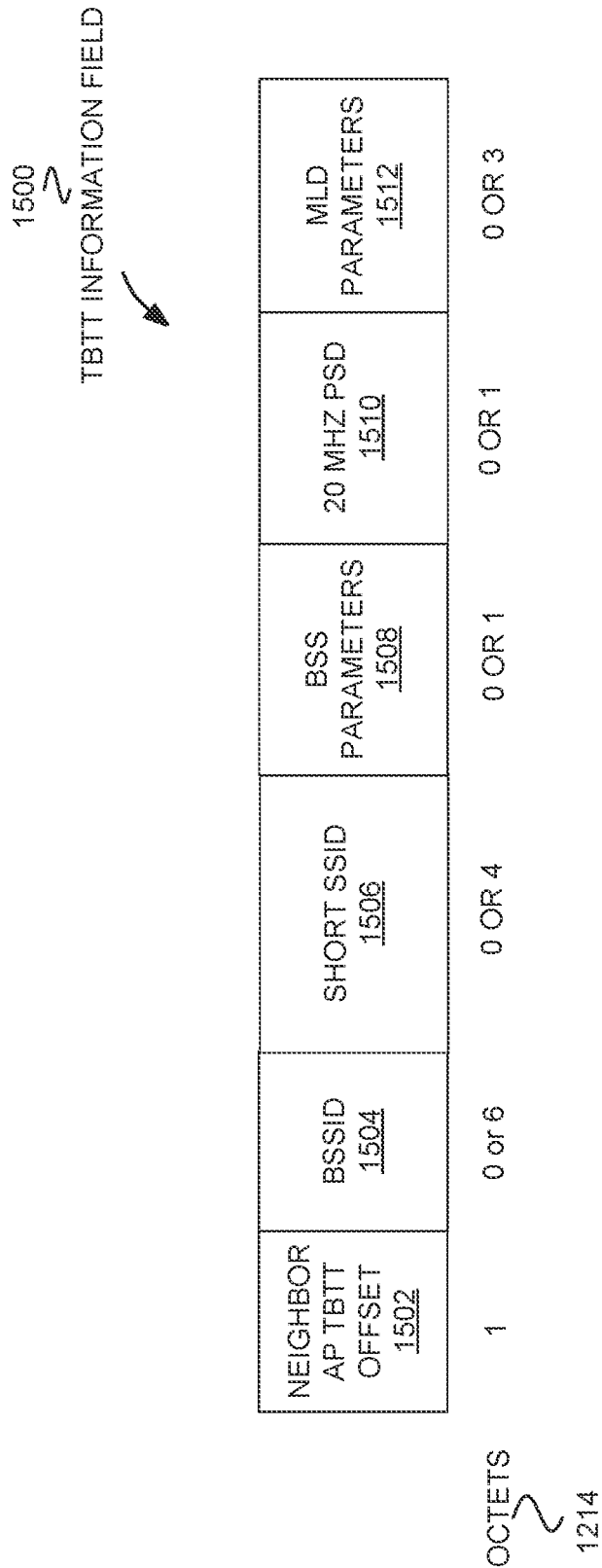
FIG. 15 illustrates a target beacon transmission time (TBTT) information field, in accordance with some embodiments.

FIG. 15 illustrates a target beacon transmission time (TBTT) information field 1500, in accordance with some embodiments. The neighbor AP TBTT offset 1502 subfield is 1 octet in length and indicates the offset in TUs, rounded down to nearest TU, to the next TBTT of an AP's BSS from the immediately prior TBTT of the AP that transmits this element. The value 254 indicates an offset of 254 TUs or higher. The value 255 indicates an unknown offset value. The BSSID 1504 is the BSSID of the AP. The BSSID 1504 field is a 48-bit field of the same format as an IEEE 802 MAC address. In some embodiments, this field uniquely identifies each BSS. The short SSID 1506 is the SSID as calculated in accordance with the communication standard. The BSS parameters 1508 indicates parameters of the BSS. The 20 MHz power spectrum density (PSD) 1510 indicates a 20 MHz PSD. The MLD parameters 1512 is MLD parameters 1400 of FIG. 14. The BSSID 1504 and short SSID 1506 are optional.

Figure 16:
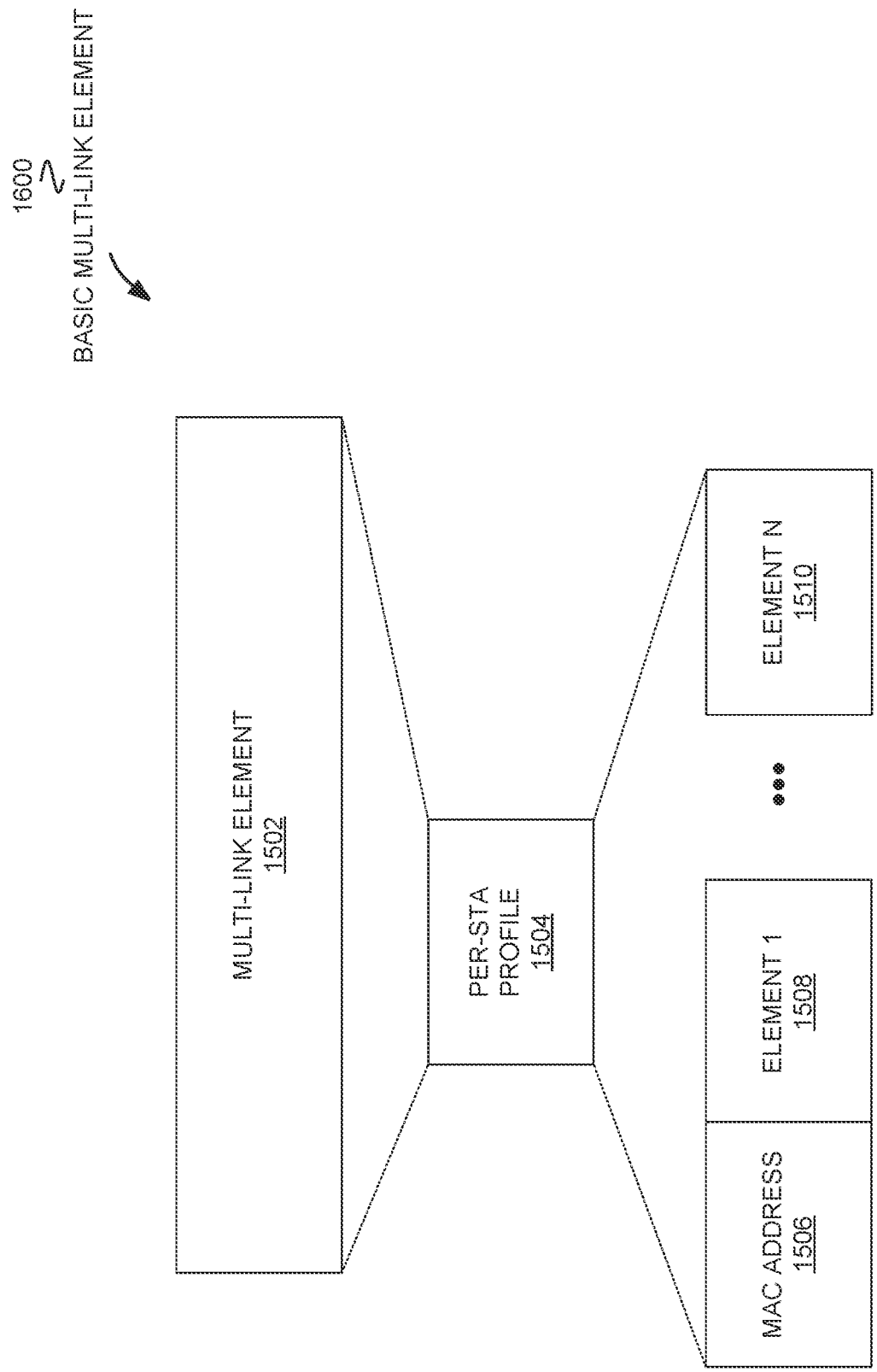
FIG. 16 illustrates a basic multi-link element, in accordance with some embodiments.

FIG. 16 illustrates a basic multi-link element 1600, in accordance with some embodiments. The multi-link element 1502 may be encoded within a management frame or another frame. The multi-link element 1502 includes a per-STA profile 1504, which may be a STA or AP of a MLD. The per-STA profile 1504 includes a MAC address 1506 field for identifying the AP of the AP MLD, and element 1 1508 through element N 1501, which are elements being included from a first AP of an AP MLD by a second AP of the same AP MLD as described herein.

Figure 17:
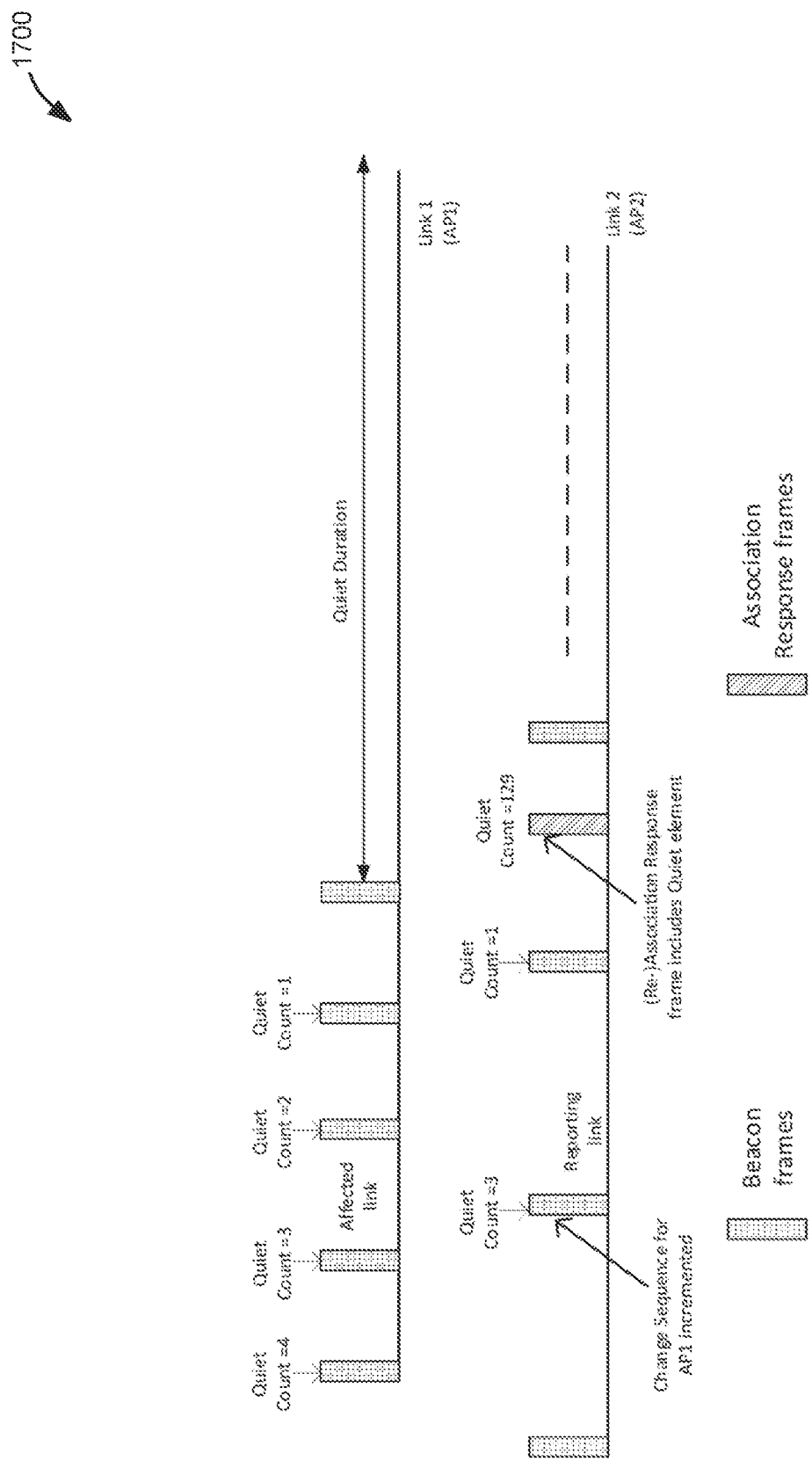
FIG. 17 illustrates the operation of an AP carrying a Quiet element to signal channel quieting on another link, in accordance with some embodiments.

FIG. 17 illustrates the operation 1700 of an AP carrying a Quiet element to signal channel quieting on another link, in accordance with some embodiments. AP1 and AP2 are part of the same ML AP logical entity 808. Quiet count is a value indicated by quiet count 1206 or quiet count 1308, in accordance with some embodiments. Time increases from left to right.

Figure 18:
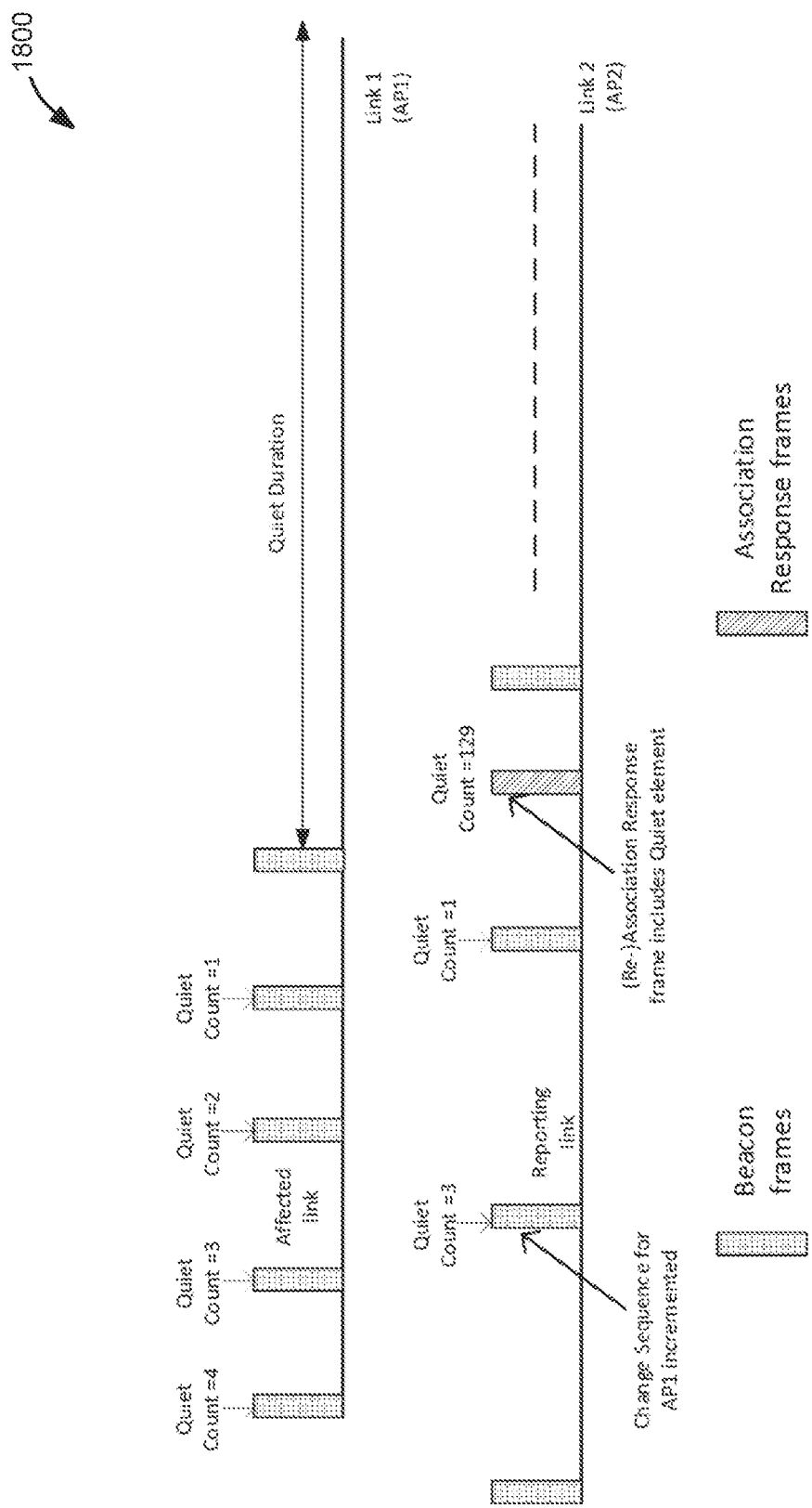
FIG. 18 illustrates the operation of an AP carrying a Channel Switch Announcement element to signal channel switching on another link, in accordance with some embodiments.

FIG. 18 illustrates the operation 1800 of an AP carrying a Channel Switch Announcement element to signal channel switching on another link, in accordance with some embodiments. AP1 and AP2 are part of the same ML AP logical entity 808. Quiet count is a value indicated by quiet count 1206 or quiet count 1308, in accordance with some embodiments. Time increases from left to right. The affected link in FIGS. 17 and 18 corresponds to 5 GHZ band 838, in accordance with the examples above.

Figure 19:
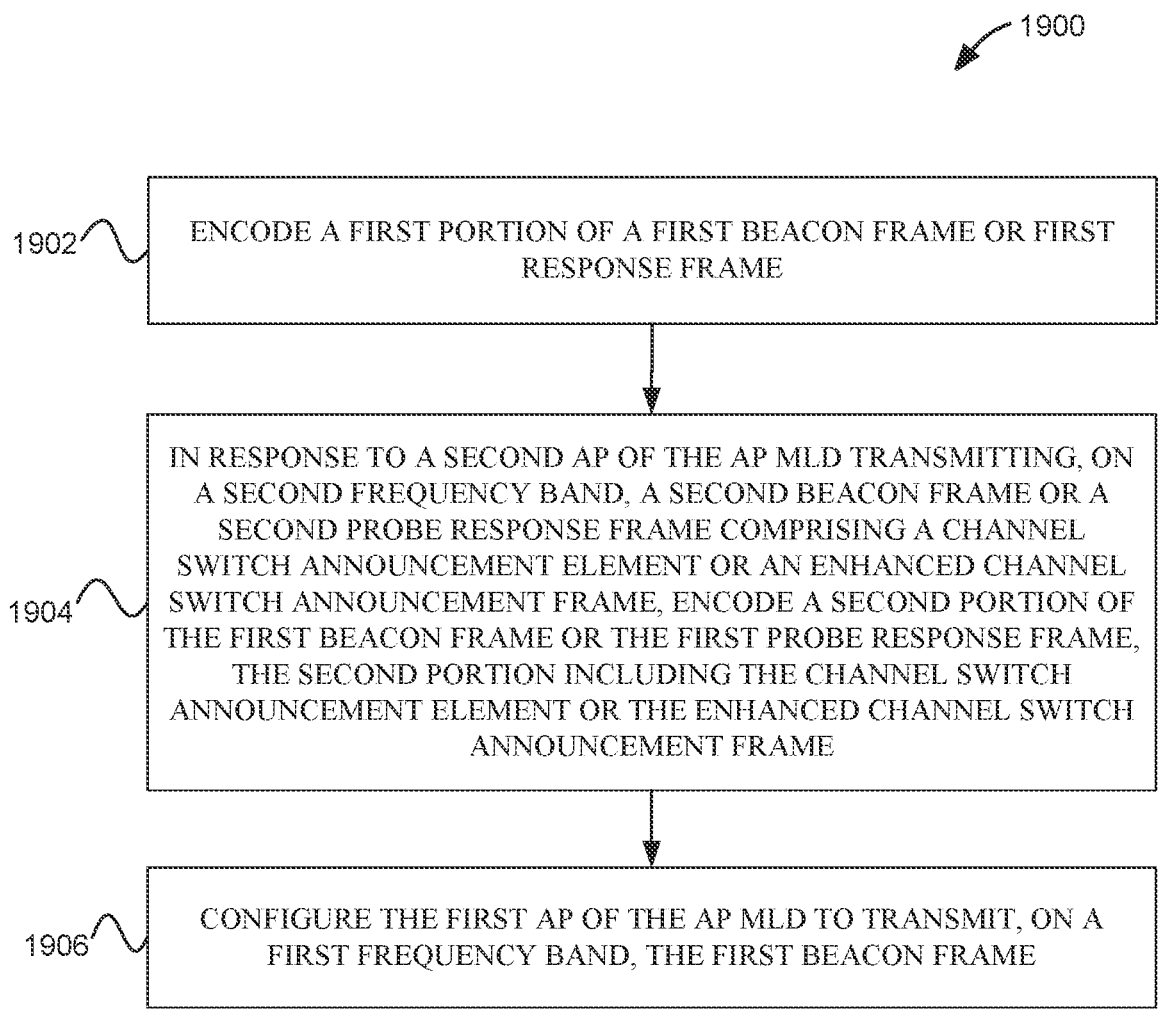
FIG. 19 illustrates a method of communicating elements between multi-link devices, in accordance with some embodiments.

FIG. 19 illustrates a method 1900 of communicating elements between multi-link devices, in accordance with some embodiments. The method 1900 begins at operation 1902 with encode a first portion of a first beacon frame or first response frame. For example, an apparatus of AP1 830 may encode a first portion of a beacon frame or first response frame. The first portion may include portions of a beacon frame that are not related to communicating information regarding other APs of the AP MLD 808.

The method 1900 continues at operation 1904 with in response to a second AP of the AP MLD transmitting, on a second frequency band, a second beacon frame or a second probe response frame comprising a channel switch announcement element or an enhanced channel switch announcement frame, encoding a second portion of the first beacon frame or the first probe response frame, the second portion comprising the channel switch announcement element or the enhanced channel switch announcement frame.

For example, the AP2 832 may encode a beacon frame to include the extended channel switch announcement element 900, channel switch announcement element 1000 and transmit it on 5 GHz Band 838. AP1 830 may encode multi-link element 1502 as part of the first beacon frame where the multi-link element 1502 includes a per-STA profile 1504 field for AP2 832 with a MAC address 1506 of AP2 832 and the extended channel switch announcement element 900, channel switch announcement element 1000 as element 1 1508.

The method 1900 continues at operation 1906 with configuring the first AP of the AP MLD to transmit, on a first frequency band, the first beacon frame. For example, an apparatus of the AP MLD 808 or of AP1 830 may configure AP1 830 to transmit a beacon frame or a probe response frame that includes the multi-link element 1502 with the extended channel switch announcement element 900 or channel switch announcement element 1000.

The method 1900 may be performed by an apparatus of an AP of an AP MLD or an apparatus of an AP MLD. The method 1900 may include one or more additional instructions. The method 1900 may be performed in a different order. One or more of the operations of method 1900 may be optional.

Figure 20:
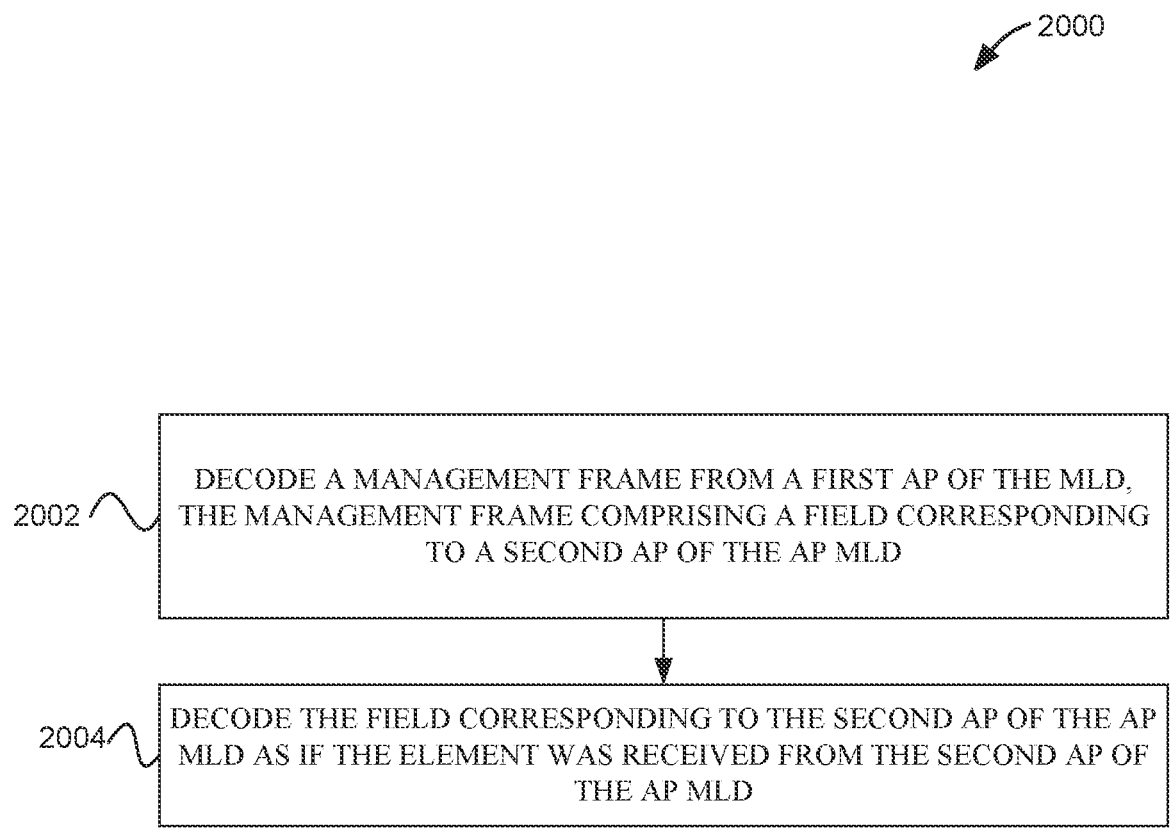
FIG. 20 illustrates a method of communicating elements between multi-link devices, in accordance with some embodiments.

FIG. 20 illustrates a method 2000 of communicating elements between multi-link devices, in accordance with some embodiments. The method 2000 begins at operation 2002 with decoding a management frame from a first AP of the MLD, the management frame comprising a field corresponding to a second AP of the AP MLD. For example, non-AP STA1 818 may receive a frame from AP1 830 with a field from AP2 832 intended for non-AP STA2 820. The field may be a Channel Switch Announcement element, an Enhanced Channel Switch Announcement element, a Maximum (Max) Channel Switch Time element, a Quiet element, a Quiet Channel element, the channel switch announcement element, or the enhanced channel switch announcement frame.

The method 2000 continues at operation 2004 with decoding the field corresponding to the second AP of the AP MLD as if the element was received from the second AP of the AP MLD by a second STA of the non-AP MLD corresponding to the second AP. The decoding may be performing actions in accordance with the field such as not transmitting for a quiet element or switching channel for channel switch announcement element. For example, non-AP STA2 820 may refrain from transmitting to the AP2 832 until a channel change is performed as described above and then transmit on the new channel. In some embodiments, operation 2004 includes processing the field corresponding to the second AP of the AP MLD as if the element was received from the second AP of the AP MLD by a second STA of the non-AP MLD associated with the second AP.

The method 2000 may be performed by an apparatus of a non-AP of a non-AP MLD or an apparatus of a non-AP MLD. The method 2000 may include one or more additional instructions. The method 2000 may be performed in a different order. One or more of the operations of method 2000 may be optional.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first access point (AP) of an AP multi-link device (MLD), the apparatus comprising memory; and processing circuitry coupled to the memory, the processing circuitry configured to:
    encode a first portion of a first beacon frame or first response frame;
    in response to a second AP of the AP MLD transmitting, on a second frequency band, a second beacon frame or a second probe response frame comprising a channel switch announcement element or an enhanced channel switch announcement frame,
    encoding a second portion of the first beacon frame or the first probe response frame, the second portion comprising the channel switch announcement element or the enhanced channel switch announcement frame; and
    configure the first AP of the AP MILD to transmit, on a first frequency band, the first beacon frame or the first response frame.

2. The apparatus of claim 1 wherein the second portion of the first beacon frame comprises a multi-link element, the multi-link element comprising an identification (ID) of the second AP of the AP MLD and the channel switch announcement element or the enhanced channel switch announcement frame.

3. The apparatus of claim 2 wherein the multi-link element comprises a per-STA profile field, the per-STA profile field comprising the ID of the second AP of the AP MLD and an element, wherein the ID of the second AP is a media access control (MAC) address of the second AP.

4. The apparatus of claim 3 wherein the element comprises one of the following group: a Channel Switch Announcement element, an Enhanced Channel Switch Announcement element, a Maximum (Max) Channel Switch Time element, a Quiet element, a Quiet Channel element, the channel switch announcement element, or the enhanced channel switch announcement frame.

5. The apparatus of claim 2 wherein the multi-link element further comprises a basic service set (BSS) change count subfield for the second AP of the AP MLD, wherein the BSS change count subfield for the second AP of the AP MLD indicates that a critical update of the BSS of the BSS change count subfield occurred.

6. The apparatus of claim 1 wherein the first AP has a first basic service set (BSS) identification (ID) and the second AP has a second BSS ID.

7. The apparatus of claim 1 wherein the first frequency band and the second frequency band are different frequencies bands and wherein the first frequency band and the second frequency band are each one of the following group: 2.4 GHz, 5 GHz, and 6 GHz.

8. The apparatus of claim 1 wherein the channel switch announcement element or the enhanced channel switch announcement frame comprise an indication of when an event is to occur, and wherein the processing circuitry is further configured to:
 encode a first portion of a third beacon frame or third response frame;
 in response to the event not having occurred, encode a second portion of the third beacon frame or the third probe response frame, the second portion comprising the channel switch announcement element or the enhanced channel switch announcement frame; and
 configure the first AP of the AP MILD to transmit, on a first frequency band, the first beacon frame or the first response frame.

9. The apparatus of claim 8 wherein the event is a change to a new channel number or when stations associated with the second AP can begin to transmit after a quiet period.

10. The apparatus of claim 1 wherein the processing circuitry is further configured to:
 encode a first portion of a third beacon frame or third response frame;
 in response to the second AP of the AP MLD transmitting, on the second frequency band, a Channel Switch Announcement element, an Enhanced Channel Switch Announcement element, a Maximum (Max) Channel Switch Time element, a Quiet element, or a Quiet Channel element,
 encode a second portion of the third beacon frame or the third probe response frame, the second portion comprising the Channel Switch Announcement element, the Enhanced Channel Switch Announcement element, the Max Channel Switch Time element, the Quiet element, or the Quiet Channel element; and
 configure the first AP of the AP MLD to transmit, on a first frequency band, the first beacon frame.

11. The apparatus of claim 10 wherein the multi-link element is a first multi-link element, and wherein the second portion of the third beacon frame comprises a second multi-link element, the second multi-link element comprising the ID of the second AP of the AP MLD and the Channel Switch Announcement element, the Enhanced Channel Switch Announcement element, the Max Channel Switch Time element, the Quiet element, or the Quiet Channel element.

12. The apparatus of claim 1, further comprising transceiver circuitry coupled to the processing circuitry, the transceiver circuitry coupled to two or more patch antennas for receiving signalling in accordance with a multiple-input multiple-output (MIMO) technique.

13. The apparatus of claim 1, further comprising transceiver circuitry coupled to the processing circuitry, the transceiver circuitry coupled to two or more microstrip antennas for receiving signalling in accordance with a multiple-input multiple-output (MIMO) technique.

14. A non-transitory computer-readable storage medium that stores instructions for execution by one or more processors of an apparatus of a first access point (AP) of an AP multi-link device (MLD), the instructions to configure the one or more processors to:
 encode a first portion of a first beacon frame or first response frame;
 in response to a second AP of the AP MILD transmitting, on a second frequency band, a second beacon frame or a second probe response frame comprising a channel switch announcement element or an enhanced channel switch announcement frame,
 encode a second portion of the first beacon frame or the first probe response frame, the second portion comprising the channel switch announcement element or the enhanced channel switch announcement frame; and
 configure the first AP of the AP MILD to transmit, on a first frequency band, the first beacon frame.

15. The non-transitory computer-readable storage medium of claim 14 wherein the second portion of the first beacon frame comprises a multi-link element, the multi-link element comprising an identification (ID) of the second AP of the AP MLD and the channel switch announcement element or the enhanced channel switch announcement frame.

16. The non-transitory computer-readable storage medium of claim 15 wherein the multi-link element comprises a per-STA profile field, the per-STA profile field comprising the ID of the second AP of the AP MILD and an element, wherein the ID of the second AP is a media access control (MAC) address of the second AP.

17. An apparatus of a first station (STA) of a non access point (non-AP) multi-link device (MIA)), the apparatus comprising memory; and processing circuitry coupled to the memory, the processing circuitry configured to:
 decode a management frame from a first AP of the MLD, the management frame comprising a field corresponding to a second AP of the AP MLD; and
 decode the field corresponding to the second AP of the AP MUD as if the element was received from the second AP of the AP MLD by a second STA of the non-AP MLD associated with the second AP.

18. The apparatus of claim 17 wherein the field comprises one of the following group: a Channel Switch Announcement element, an Enhanced Channel Switch Announcement element, a Maximum (Max) Channel Switch Time element, a Quiet element, a Quiet Channel element, the channel switch announcement element, or the enhanced channel switch announcement frame.

19. The apparatus of claim 17 further comprising:
associating with the MLD, wherein the first AP operates on a first frequency band and the second AP operates on a second frequency band and wherein the first frequency band and the second frequency band are different and each are one of the following group: 2.4 GHz, 5 GHz, and 6 GHz.

20. The apparatus of claim 17 wherein the field is an enhanced channel switch announcement element, and wherein the processing circuitry is further configured to:
refrain from transmitting to the second AP until the second AP switches to a new channel indicated in the enhanced channel switch announcement element; and
transmit a frame to the second AP on the new channel after the second AP switches to the new channel.

\* \* \* \* \*